US010345786B2

(12) United States Patent
Bryson et al.

(10) Patent No.: US 10,345,786 B2
(45) Date of Patent: Jul. 9, 2019

(54) METHOD AND SYSTEM FOR PROACTIVE HEATING-BASED CRACK PREVENTION IN 3D PRINTING

(71) Applicant: International Business Machines Corporation, Armonk, NY (US)

(72) Inventors: Donald L. Bryson, Rossville, GA (US); Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 419 days.

(21) Appl. No.: 15/044,566

(22) Filed: Feb. 16, 2016

(65) Prior Publication Data

US 2017/0232678 A1 Aug. 17, 2017

(51) Int. Cl.
*G05B 19/404* (2006.01)
*B29C 64/393* (2017.01)
*B33Y 50/02* (2015.01)

(52) U.S. Cl.
CPC .......... *G05B 19/404* (2013.01); *B29C 64/393* (2017.08); *B33Y 50/02* (2014.12);
(Continued)

(58) Field of Classification Search
CPC ........ G05B 19/404; G05B 2219/35134; G05B 2219/49007; B29C 64/393; B33Y 50/02
(Continued)

(56) References Cited

U.S. PATENT DOCUMENTS 7,342,195 B2 * 3/2008 Adams .................. B23K 10/02 219/121.46
8,425,973 B2 4/2013 Dunne
(Continued)

FOREIGN PATENT DOCUMENTS

CN 103160825 A 6/2013
CN 103231015 B 5/2015

OTHER PUBLICATIONS

In The OSTI Collections: 3-d Printing and Other Additive Manufacturing Technologies; Retrieved on Dec. 17, 2015; Retrieved from http://www.osti.gov/home/osti-collections-3-d-printing-and-other-additive-manufacturing-technologies.
(Continued)

*Primary Examiner* — Tha-O H Bui
(74) *Attorney, Agent, or Firm* — Cantor Colburn LLP; Tihon Poltavets

(57) ABSTRACT

A computer program product for proactive heating-based crack preventing in three-dimensional printing is provided. The computer program product includes a computer readable storage medium having program instructions embodied therewith. The program instructions are readable and executable by a processing circuit to cause the processing circuit to read a three-dimensional model to be printed, determine if the read three-dimensional model has open-ended or closed-ended layers, for each closed-ended layer, calculate start and end heating times and amount of heat requirement for materials of the closed-end layers and control a heating of the closed-ended layers in accordance with the calculation during a laying down of each of the closed-ended layers.

14 Claims, 6 Drawing Sheets

(52) U.S. Cl.
CPC .............. *G05B 2219/35134* (2013.01); *G05B 2219/49007* (2013.01); *G05B 2219/49008* (2013.01); *G05B 2219/49023* (2013.01)

(58) Field of Classification Search
USPC .......................................................... 700/119
See application file for complete search history.

(56) References Cited

U.S. PATENT DOCUMENTS

| | | | | |
|---|---|---|---|---|
| 8,718,522 | B2 | 5/2014 | Chillscyzn et al. | |
| 9,079,248 | B2 | 7/2015 | Ackelid | |
| 2010/0310786 | A1* | 12/2010 | Dunne ............... | A61C 13/0004 427/487 |
| 2012/0196100 | A1 | 8/2012 | Boyce et al. | |
| 2014/0257518 | A1 | 9/2014 | McAlpine et al. | |
| 2014/0265040 | A1 | 9/2014 | Batchelder | |
| 2015/0053291 | A1 | 2/2015 | Hummel et al. | |
| 2015/0273766 | A1 | 10/2015 | Denda et al. | |
| 2017/0232678 | A1 | 8/2017 | Bryson et al. | |
| 2017/0236331 | A1 | 8/2017 | Bryson et al. | |
| 2018/0067470 | A1 | 3/2018 | Bryson et al. | |

OTHER PUBLICATIONS

"Troubleshooting 3d Prints Fixing warping and cracking", Retrieved from <URL: https://www.youtube.com/watch?u=TCIynRIzm8c.
List of IBM Patents or Patent Applications Treated as Related; (Appendix P), Filed Nov. 10, 2017, 2 pages.
List of IBM Patents or Patent Applications Treated as Related; (Appendix P), Filed Feb. 19, 2019; 2 pages.

* cited by examiner

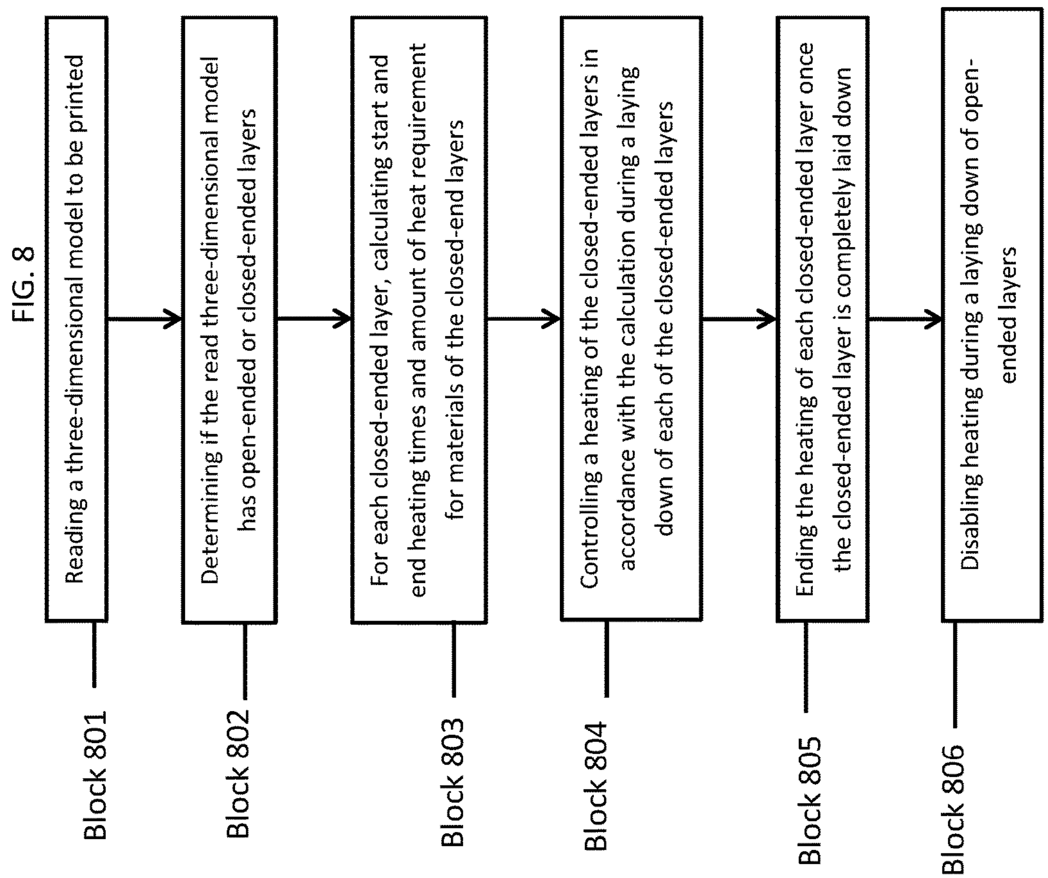
FIG. 8
Reading a three-dimensional model to be printed
Block 801
Determining if the read three-dimensional model has open-ended or closed-ended layers
Block 802
For each closed-ended layer, calculating start and end heating times and amount of heat requirement for materials of the closed-end layers
Block 803
Controlling a heating of the closed-ended layers in accordance with the calculation during a laying down of each of the closed-ended layers
Block 804
Ending the heating of each closed-ended layer once the closed-ended layer is completely laid down
Block 805
Disabling heating during a laying down of open-ended layers
Block 806

METHOD AND SYSTEM FOR PROACTIVE HEATING-BASED CRACK PREVENTION IN 3D PRINTING

BACKGROUND

The present invention relates to three-dimensional printing or additive manufacturing and, more specifically, to a method and system of proactive heating-based crack prevention in three-dimensional (3D) printing or additive manufacturing.

Three-dimensional printing involves successive layers of material being laid down onto a substrate or each other from a dispensing head that is controlled by a computer. Three-dimensional printed objects can be of almost any shape or geometry and are derived from a three-dimensional model or other electronic data source that is loaded into the controlling computer. The dispensing head is a component of a three-dimensional printer, which itself is a type of industrial robot.

In the case of large three-dimensional printed objects, completion of the laying down of each successive layer requires a relatively long period of time as the dispensing head traverses the length of the layer. This leads to the generation of a time gap between the laying down of the starting point of a layer to an end point of the laying down of the layer. Thus, by the time the dispensing head reaches the end point, the material dispensed at the start point may harden and may lead to a fine gap between the starting and end point of the layer.

SUMMARY

According to an embodiment of the present invention, a computer program product for proactive heating-based crack preventing in three-dimensional printing is provided. The computer program product includes a computer readable storage medium having program instructions embodied therewith. The program instructions are readable and executable by a processing circuit to cause the processing circuit to read a three-dimensional model to be printed, determine if the read three-dimensional model has open-ended or closed-ended layers, for each closed-ended layer, calculate start and end heating times and amount of heat requirement for materials of the closed-end layers and control a heating of the closed-ended layers in accordance with the calculation during a laying down of each of the closed-ended layers.

According to another embodiment of the present invention, a computing system for proactive heating-based crack preventing in three-dimensional printing is provided. The computing system includes a computer readable storage medium having instructions stored thereon that are executable by a processing circuit to cause the processing circuit to read a three-dimensional model to be printed, determine if the read three-dimensional model has open-ended or closed-ended layers, for each closed-ended layer, calculate start and end heating times and amount of heat requirement for materials of the closed-end layers and control a heating of the closed-ended layers in accordance with the calculation during a laying down of each of the closed-ended layers.

According to yet another embodiment of the present invention, a computer-implemented method for proactive heating-based crack preventing in three-dimensional printing is provided and includes reading a three-dimensional model to be printed, determining if the read three-dimensional model has open-ended or closed-ended layers, for each closed-ended layer, calculating start and end heating times and amount of heat requirement for materials of the closed-end layers and controlling a heating of the closed-ended layers in accordance with the calculation during a laying down of each of the closed-ended layers.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 8 is a flow diagram illustrating a computer-implemented method for proactive heating-based crack prevention in three-dimensional printing.

DETAILED DESCRIPTION

As will be described below, a method and system are provided for controlling a three-dimensional printing of an object by heating closed-ended layers to facilitate crack prevention in those closed-ended layers. Such heating will allow start and end points of closed-ended layers to be maintained in a liquid state during the time period taken to lay down the layer so that subsequent crystal formation will be substantially uniform along an entire length of the closed-ended layer and perfect (or nearly perfect) joining can be achieved. The heating will be controlled by heating a controller in accordance with heating algorithms stored therein and various layer material properties and crystal formation temperatures.

Figure 1:
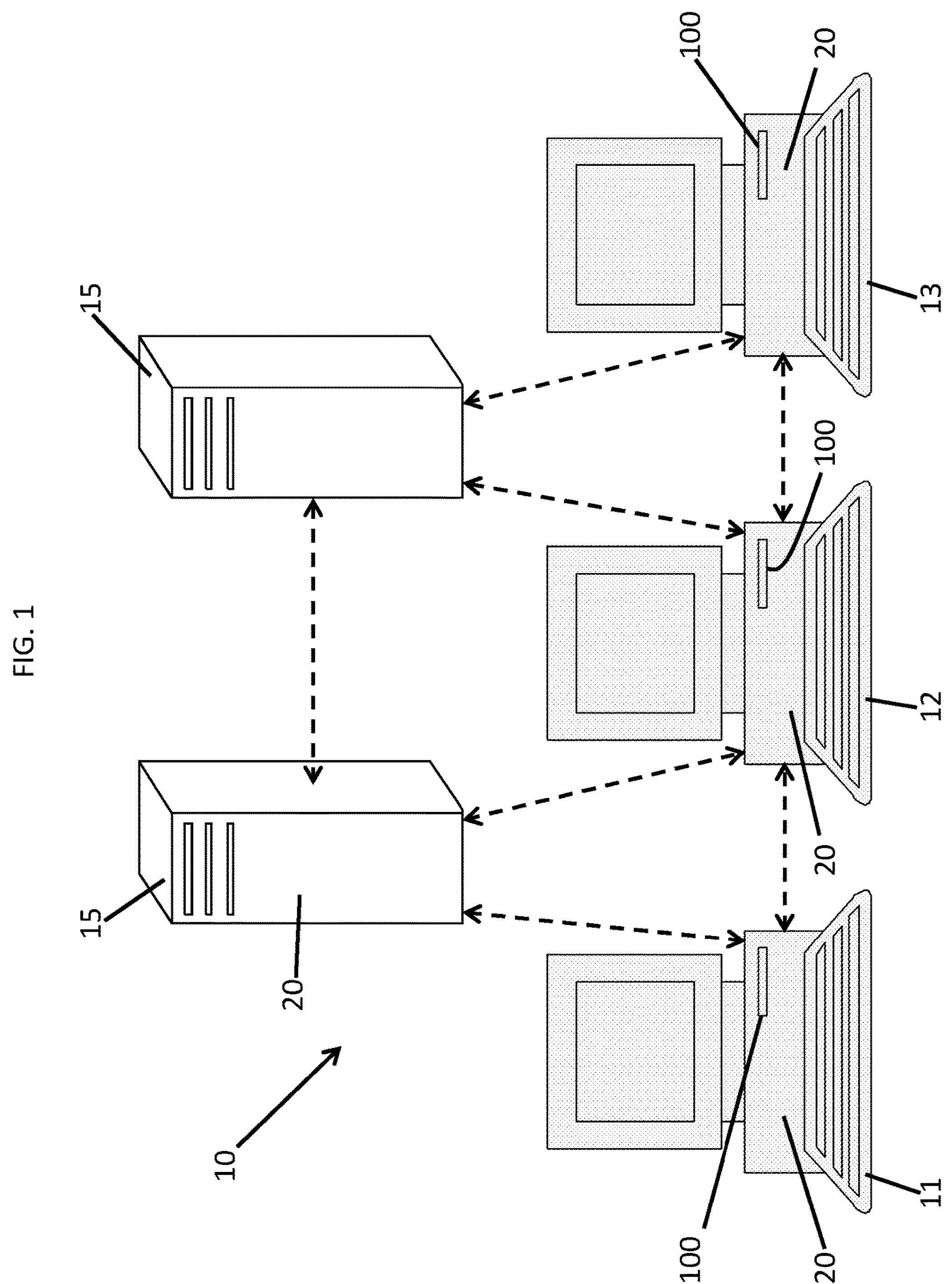
FIG. 1 is a schematic illustration of a computing system.

With reference to FIG. 1, a computing system 10 is provided and may be configured for example as an enterprise computing system or as a personal computing system. In either case, the first computing system 10 includes first, second and third computing devices 11, 12 and 13 and servers 15 which are configured to be networked together for communication purposes. Each of the first, second and third computing devices 11, 12 and 13 and the servers 15 may include among other features a processing circuit 20, a display, user input devices and a networking unit as well as a computer program product 100 for proactive heating-based crack prevention in three-dimensional printing.

The processing circuit 20 may be provided as a microprocessor, a central processing unit (CPU) or any other suitable processing device. The display may be provided as a monitor and is configured to display data and information as well as a graphical user interface to an administrator or user. The user input devices may be provided as a mouse and a keyboard combination and are configured to allow the administrator or user to input commands to the processing circuit 20. The networking unit may be provided as an Ethernet or other suitable networking device by which the first, second and third computing devices 11, 12 and 13 and servers 15 are communicative.

Figure 2:
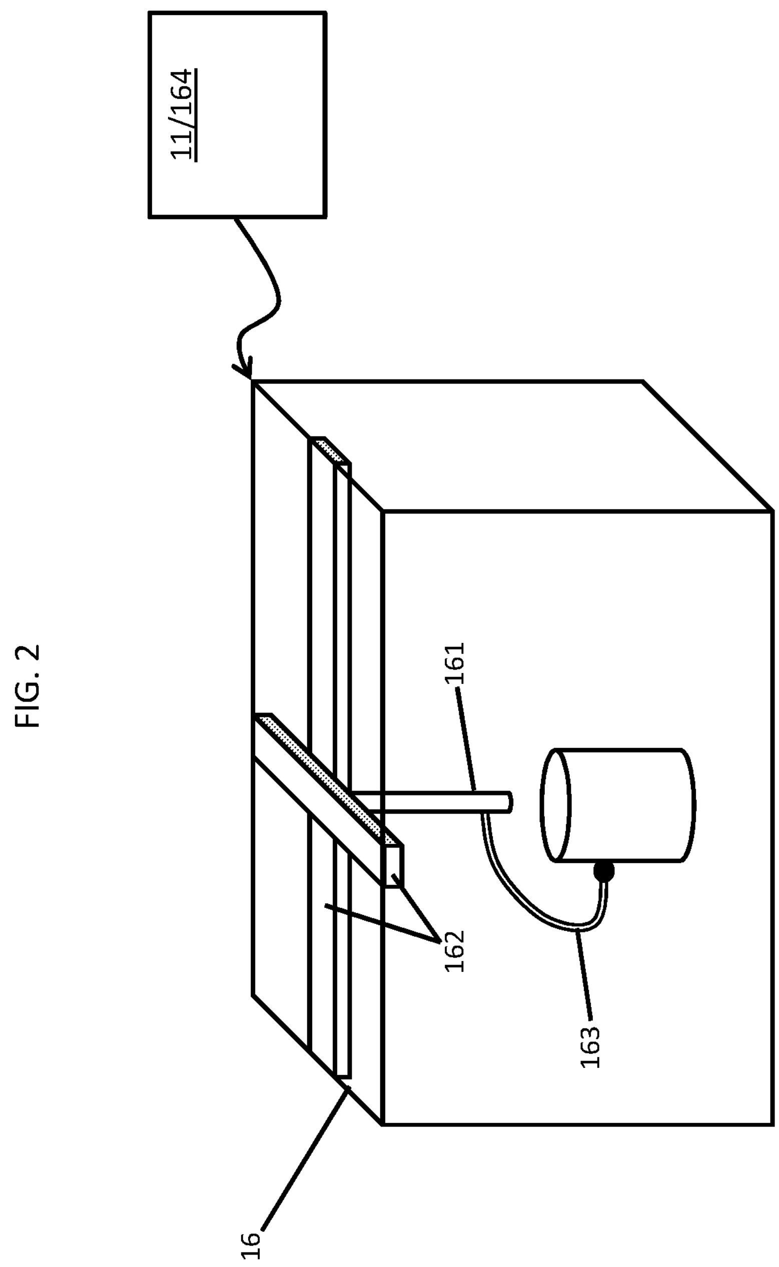
FIG. 2 is a schematic diagram of a three-dimensional printer.

With reference to FIG. 2, any one or more of the first, second and third computing devices 11, 12 and 13 and the servers 15 may be coupled to a three-dimensional printer 16. For purposes of clarity and brevity, however, the following description will relate to the exemplary case in which the first computing device 11 is coupled to the three-dimensional printer 16.

As shown in FIG. 2, the three-dimensional printer 16 includes a housing 160, a dispenser 161, servo elements 162 that are supportively and movably disposed in the housing 160 to control a movement of the dispenser 161 and a heating element 163. The housing 160 is formed to define an empty space in an interior thereof and the dispenser 161 is configured to dispense three-dimensional printing materials onto a substrate within the empty space in order to additively manufacture a given object. This object is formed in accordance with a three-dimensional model, which may be loaded into the first computing device 11. The first computing device 11 thus acts as a controller 164 of the three-dimensional printer 16 and controls various operations of the dispenser 161, servo elements 162 and the heating element 163.

In general, three-dimensional printing operations are conducted by the dispenser 161 being controlled to dispense three-dimensional printing materials along a substrate or an underlying layer while moving from one point to another. The dispensed three-dimensional printing material hardens and thus forms a new layer on which an additional layer may be dispensed. The temperature and rate of dispensation of the three-dimensional printing materials at the moment of dispensation is material and object specific, which means that the temperature and the rate of dispensation can vary based on multiple factors. The factors include the size/spatial dimensions of the object and a type of the three-dimensional printing materials.

Figure 3:
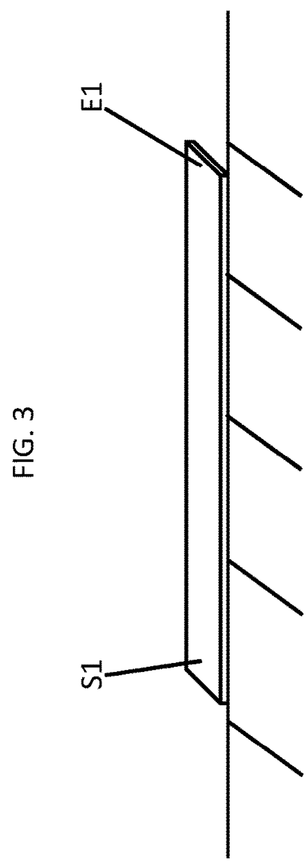
FIG. 3 is a top down view of a laying down of an open-ended three-dimensionally printed layer.
Figure 4:
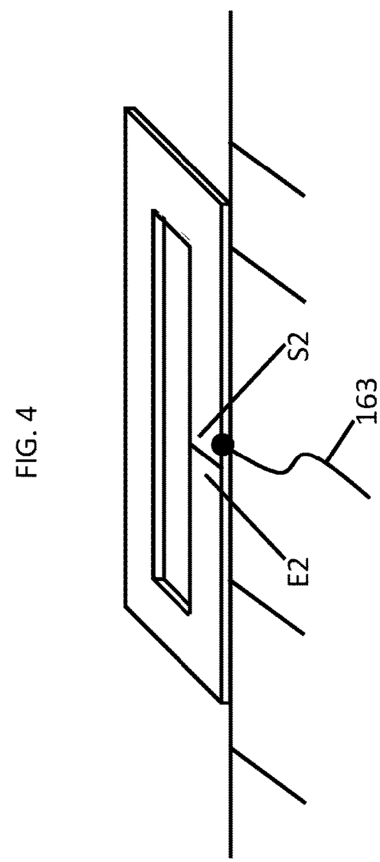
FIG. 4 is a top down view of a laying down of a closed-ended three-dimensionally printed layer.
Figure 5:
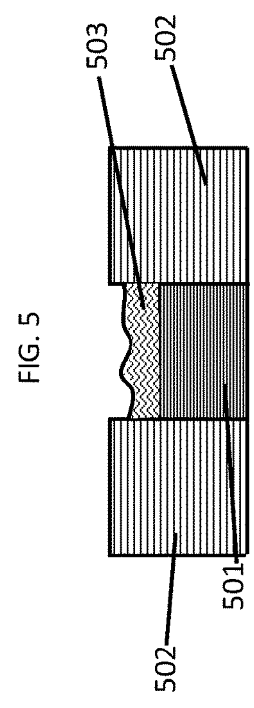
FIG. 5 is an axial view of wall portions provided to contain three-dimensional printing material in liquid form in accordance with embodiments.

With reference to FIGS. 3-5, it is to be understood that the three-dimensional printing operations may be undertaken to form simply geometric shapes or complex geometric shapes. In either case, each layer of the object being printed may be open-ended (see FIG. 3) or closed-ended (see FIG. 4).

In the case of open-ended layers, as shown in FIG. 3, the dispenser 161 begins dispensing three-dimensional printing materials at a first or starting point S1 and ends the dispensation at a second or ending point E1, which is different from the starting point S1. Conversely, as shown in FIG. 4, in the case of open-ended layers, the dispenser 161 begins dispensing three-dimensional printing materials at a first or starting point S2 and ends the dispensation at a second or ending point E2, which is proximate (i.e., abutting or adjacent) to the starting point S2.

For those layers that are closed-ended, with continued reference to FIG. 4 and to FIG. 5, it has been seen that the three-dimensional printing materials dispensed at or near the starting point at the beginning of the layer dispensation will tend to harden in the time taken by the dispenser 161 to complete the layer dispensation and arrive at the ending point E2 near the starting point S2. As such, the three-dimensional printing materials at or around the ending point E2/starting point S2 may have different hardening times and patterns whereby adjacent portions of the closed-ended layers may be partially hardened and partially molten/soft/semi-hardened. This can leads to localized cracks in the closed-ended layer and, in some cases, crack propagation throughout the resulting object.

To this end, the heating element 163 (see FIGS. 2 and 4) is provided to heat certain portions of the object to be printed during the dispensation of the closed-ended layers. The heating element 163 may be fixed relative to the housing 160 or movable with or relative to either the housing 160 or the dispenser 161. The heating element 163 may be provided as a single or multiple heaters and may be provided as one or more of a laser, a heating fluid system or a radiation emitting element. In such cases, the heating element 163 may be disposed to heat the closed-ended layers specifically, an underlying substrate/layer or an upper surface of a closed-ended layer.

In accordance with further embodiments, as shown in FIG. 5, the dispenser 161 may be controlled to dispense three-dimensional printing materials in order to build and assemble layers of a given printed element 501 and, especially for cases where the printed element 501 is closed-ended, to additionally build wall portions 502 of suitable material on either side of the printed element 501 (it is to be understood that the wall portions 502 need not be printed by the dispenser 161 and could be formed or provided by several processes). These wall portions 502 are tightly fit to the sides of the printed element 501 and have sufficient height to protrude above any additional layering of three-dimensional printing materials added onto the uppermost surface of the printed element 501. Thus, when such three-dimensional printing materials are laid down by the dispenser 161 as additional layering 503 and then maintained in liquid form by the heating element 163, the wall portions 502 serve to contain the three-dimensional printing materials in place and to prevent undesired flows (e.g., spillage off the sides of the printed element 501).

Figure 6:
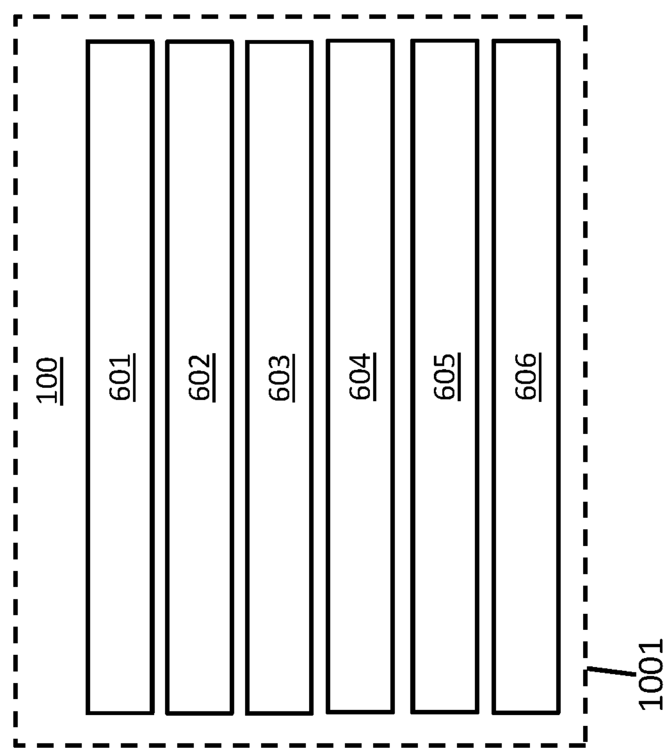
FIG. 6 is a schematic diagram of a computer program product for proactive heating-based crack prevention in three-dimensional printing.

With reference to FIG. 6, the computer program product 100 includes a computer readable storage medium 1001 and may be installed in a memory unit of the first computing device 11 as firmware or as lower level executable program instructions. In any case, the computer program product 100 is provided for proactive heating-based crack preventing in three-dimensional printing and has first-sixth program instructions 601-606 embodied therewith. The first-fourth program instructions 601-604 are readable and executable by the processing circuit 20 to respectively cause the processing circuit 20 to read a three-dimensional model to be printed, to determine if the read three-dimensional model has open-ended or closed-ended layers, for each closed-ended layer, to calculate start and end heating times and amount of heat requirement for materials of the closed-end layers and to control a heating of the closed-ended layers at a nozzle of the dispenser 161, an underlying substrate/layer or at an upper surface of a closed-ended layer in accordance with the calculation during a laying down of each of the closed-ended layers. The fifth and sixth program instructions 605 and 606 respectively cause the processing circuit 20 to end the heating of each closed-ended layer once the closed-ended layer is completely laid down by the dispenser 161 and to disable heating during a laying down of open-ended layers.

Figure 7:
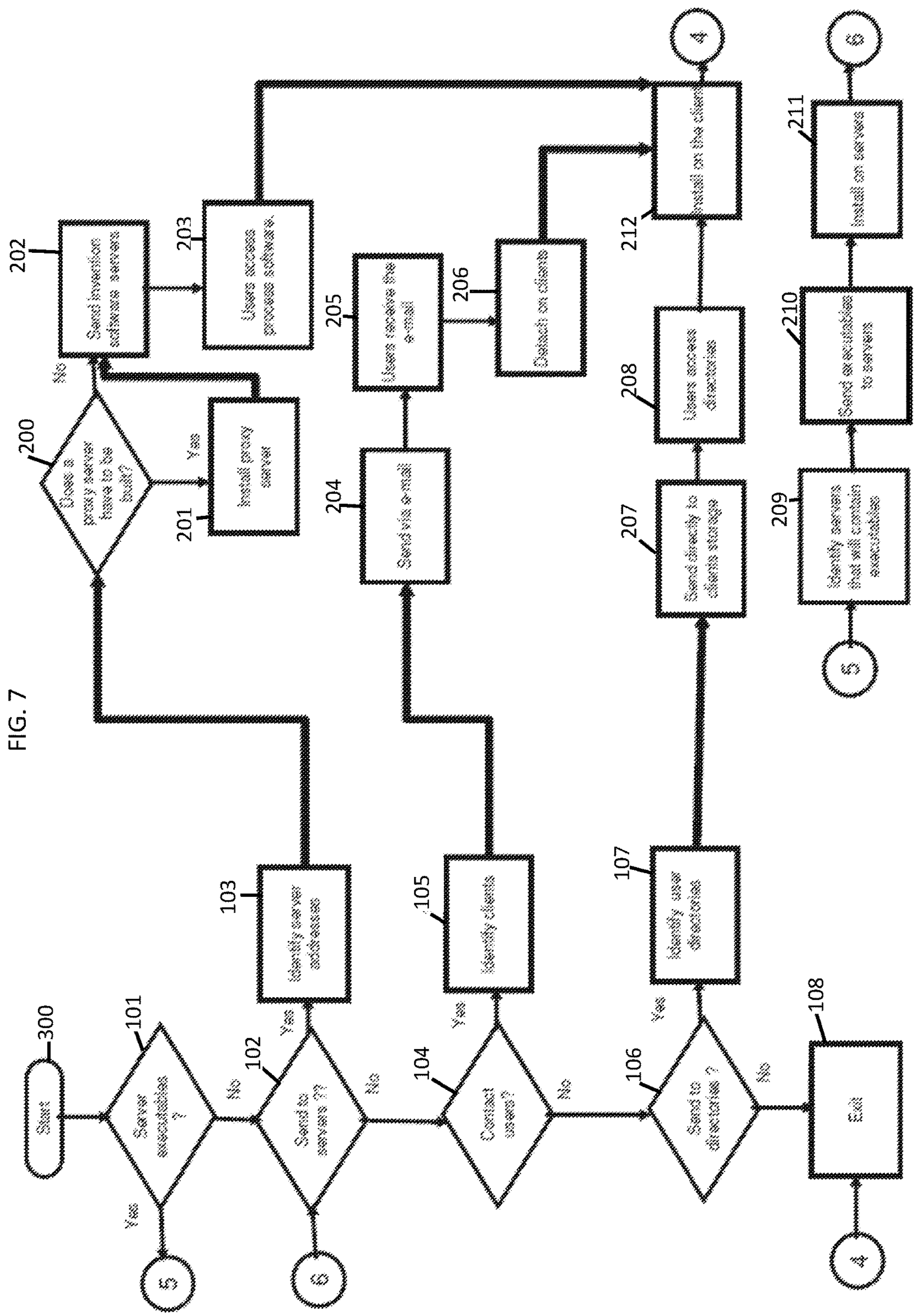
FIG. 7 is a flow diagram illustrating a deployment process of the computer program product of FIG. 6.

In accordance with embodiments and, with reference to FIG. 7, a deployment process of the computer program product described above is provided. The process begins at block 300 and at block 101 with a determination of whether the first-sixth program instructions 601-606 will reside on server 15 when executed. If so, then the server 15 is identified at block 209. The first-sixth program instructions 601-606 are then transferred directly to the server 15 storage via FTP or some other protocol or by copying though the use of a shared file system at block 210 such that the first-sixth program instructions 601-606 are installed on the servers at block 211.

Next, a determination is made on whether the first-sixth program instructions 601-606 are to be deployed by having users access to the first-sixth program instructions 601-606 on server 15 at block 102. If so, the server 15 addresses that will store the first-sixth program instructions 601-606 are identified at block 103 and a determination is made if a proxy server is to be built at block 200 for storage. A proxy server is a server that sits between a client application, such as a Web browser, of first computing device 11 and server 15 and operates by intercepting all requests to the server 15 to see if it can fulfill the requests itself (see, e.g., remote web server 15*a* of FIGS. 2 and 3). If not, the proxy server forwards the request to server 15. The two primary benefits of a proxy server are to improve performance and to filter requests.

If a proxy server is required, then the proxy server is installed at block 201 and the first-sixth program instructions 601-606 are sent via a protocol, such as FTP, or by being copied directly from the source files to the server 15 files via file sharing at block 202. Another embodiment involves sending a transaction to the (one or more) server 15 that contained the process software, and have the server 15 process the transaction and then receive and copy the process software to the server 15 file system. Once the process software is stored, the users may then access the first-sixth program instructions 601-606 and copy to the same to their respective client computer file systems at block 203. Alternatively, the server 15 may automatically copy the first-sixth program instructions 601-606 to each client and then run an installation program for the first-sixth program instructions 601-606 on each client computer whereby the user executes the program that installs the first-sixth program instructions 601-606 on his client computer at block 212 and then exits the process at block 108.

At block 104, a determination is made as to whether the first-sixth program instructions 601-606 are to be deployed by being sent to users via e-mail. If a result of the determination is affirmative, the set of users are identified together with the addresses of the user client computers at block 105 and the first-sixth program instructions 601-606 are sent via e-mail to each of the users' client computers. The users then receive the e-mail at block 205 and detach the first-sixth program instructions 601-606 from the e-mail to a directory on their client computers at block 206. The user executes the program that installs the first-sixth program instructions 601-606 on his client computer at block 212 and then exits the process at block 108.

Lastly, a determination is made on whether the first-sixth program instructions 601-606 will be sent directly to user directories on their client computers at block 106. If so, the user directories are identified at block 107 and the process software is transferred directly to the user's client computer directories at block 207. This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the first-sixth program instructions 601-606 at block 208, execute the program that installs the first-sixth program instructions 601-606 at block 212 and then exit the process at block 108.

With reference to FIG. 8, a computer-implemented method for proactive heating-based crack preventing in three-dimensional printing is provided. As shown in FIG. 8, the computer-implemented method includes reading a three-dimensional model to be printed at block 801, determining if the read three-dimensional model has open-ended or closed-ended layers at block 802, for each closed-ended layer, calculating start and end heating times and amount of heat requirement for materials of the closed-end layers at block 803 and controlling a heating of the closed-ended layers in accordance with the calculation during a laying down of each of the closed-ended layers at block 804. The computer-implemented method further includes ending the heating of each closed-ended layer once the closed-ended layer is completely laid down at block 805 and disabling heating during a laying down of open-ended layers at block 806.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for proactive heating-based crack preventing in three-dimensional printing, the computer program product comprising a non-transitory computer readable storage medium having program instructions embodied therewith, the program instructions being readable and executable by a processing circuit to cause the processing circuit to:

read a three-dimensional model to be printed;

determine whether the read three-dimensional model has closed-ended layers, each closed-ended layer comprising a starting point and an end point abutting the starting point;

for each closed-ended layer, calculate start and end heating times and an amount of heat requirement for materials of the closed-end layers;

dispense the materials of the closed-ended layers from a dispensing nozzle to accomplish a laying down of each of the closed-ended layers while moving the dispensing nozzle along circuits respectively corresponding to each of the closed-ended layers from the corresponding starting point to the corresponding end point; and control a heating of the closed-ended layers in accordance with the calculation during the laying down of each of the closed-ended layers, wherein the control of the heating is executed such that the starting point of each closed-ended layer is maintained in a liquid state by the heating from a time at which the materials of the closed-ended layers at the starting point are laid down until the materials of the closed-ended layers at the end point of that closed-ended layer are laid down.

2. The computer program product according to claim 1, wherein the program instructions further cause the processing circuit to end the heating of each closed-ended layer once the closed-ended layer is completely laid down.

3. The computer program product according to claim 1, wherein the program instructions further cause the processing circuit to disable heating during a laying down of open-ended layers of the read three-dimensional model.

4. The computer program product according to claim 1, wherein the program instructions further cause the processing circuit to control the heating at a dispensing nozzle.

5. The computer program product according to claim 1, wherein the program instructions further cause the processing circuit to control the heating at a substrate or an underlying layer.

6. The computer program product according to claim 1, wherein the program instructions further cause the processing circuit to control the heating at an upper surface of each closed-ended layer.

7. The computer program product according to claim 1, wherein the program instructions further cause the processing circuit to control the heating by way of a laser, heating fluid or exposure to radiation.

8. A computing system for proactive heating-based crack preventing in three-dimensional printing, the computing system comprising a non-transitory computer readable storage medium having instructions stored thereon that are executable by a processing circuit to cause the processing circuit to:

read a three-dimensional model to be printed;

determine whether the read three-dimensional model has closed-ended layers, each closed-ended layer comprising a starting point and an end point abutting the starting point;

for each closed-ended layer, calculate start and end heating times and amount of heat requirement for materials of the closed-end layers;

dispense the materials of the closed-ended layers from a dispensing nozzle to accomplish a laying down of each of the closed-ended layers while moving the dispensing nozzle along circuits respectively corresponding to each of the closed-ended layers from the corresponding starting point to the corresponding end point; and control a heating of the closed-ended layers in accordance with the calculation during the laying down of each of the closed-ended layers, wherein the control of the heating is executed such that the starting point of each closed-ended layer is maintained in a liquid state by the heating from a time at which the materials of the closed-ended layers at the starting point are laid down until the materials of the closed-ended layers at the end point of that closed-ended layer are laid down.

9. The computing system according to claim 8, wherein the instructions further cause the processing circuit to end the heating of each closed-ended layer once the closed-ended layer is completely laid down.

10. The computing system according to claim 8, wherein the instructions further cause the processing circuit to disable heating during a laying down of open-ended layers of the read three-dimensional model.

11. The computing system according to claim 8, wherein the instructions further cause the processing circuit to control the heating at a dispensing nozzle.

12. The computing system according to claim 8, wherein the instructions further cause the processing circuit to control the heating at a substrate or an underlying layer.

13. The computing system according to claim 8, wherein the instructions further cause the processing circuit to control the heating at an upper surface of each closed-ended layer.

14. The computing system according to claim 8, wherein the instructions further cause the processing circuit to control the heating by way of a laser, heating fluid or exposure to radiation.

* * * * *